Sept. 24, 1957 R. R. CARLSON 2,807,351
BALE ELEVATOR

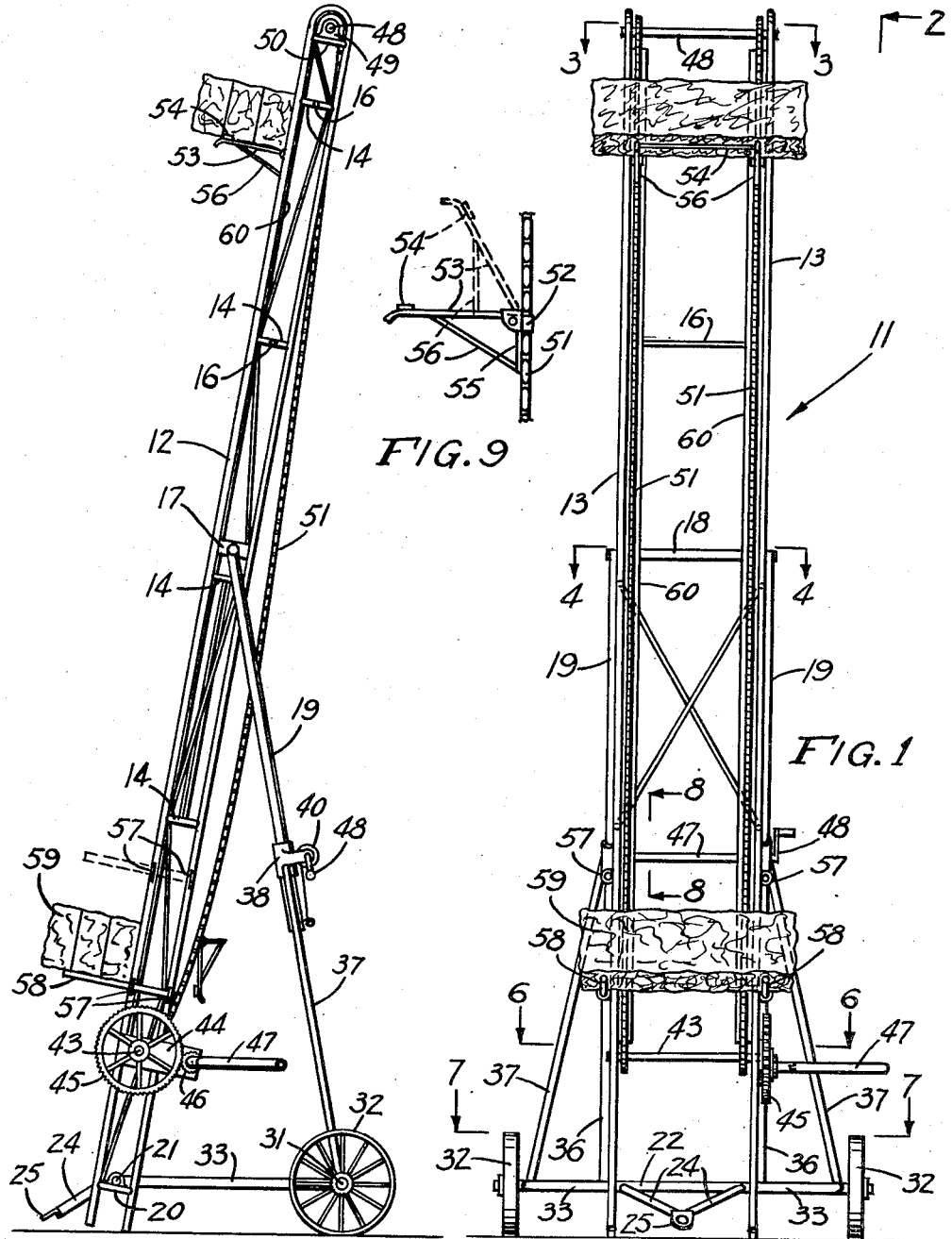

Filed Nov. 25. 1955 2 Sheets-Sheet 2

INVENTOR.
RUSSELL R. CARLSON
BY
McMorrow, Berman + Davidson
ATTORNEYS

United States Patent Office 2,807,351
Patented Sept. 24, 1957

2,807,351

BALE ELEVATOR

Russell R. Carlson, Wessington Springs, S. Dak.

Application November 25, 1955, Serial No. 548,832

2 Claims. (Cl. 198—122)

This invention relates to improvements in loading devices, and more particularly to an improved elevator for loading baled hay and similar material.

A main object of the invention is to provide a novel and improved bale elevator which is simple in construction, which is readily movable to its desired location of use, and which is easy to set up for operation.

A further object of the invention is to provide an improved device for loading baled hay and similar material, said device being inexpensive to fabricate, being rugged in construction, being easy to operate, and being adapted to be driven from the power takeoff shaft of a conventional farm tractor.

Further objects and advantages of the invention will become apparent from the following description and claims, and from the accompanying drawings, wherein:

Figure 1 is a front elevational view of an improved bale elevator constructed in accordance with the present invention.

Figure 2 is a side elevational view taken on the line 2—2 of Figure 1.

Figure 9 is an enlarged side elevational detail view showing the manner in which the bale supporting arms are connected to the endless sprocket conveyor chains of the elevator device of Figures 1 to 8.

Figure 4:
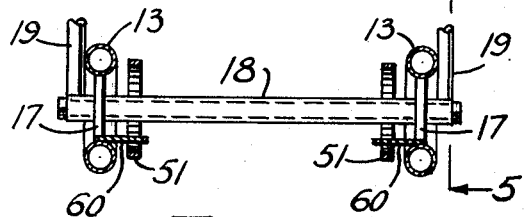
Figure 4 is an enlarged horizontal cross sectional view taken on the line 4—4 of Figure 1.
Figure 6:
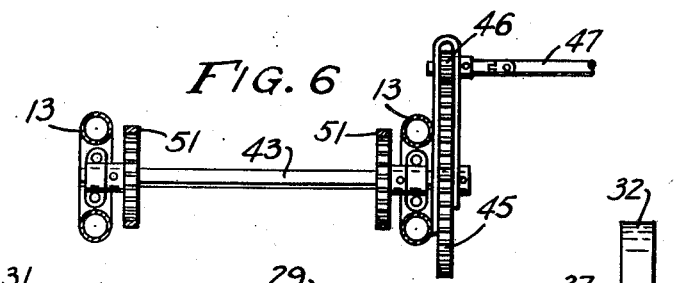
Figure 6 is an enlarged horizontal cross sectional view taken on the line 6—6 of Figure 1.

Referring to the drawings, the improved elevator device is designated generally at 11 and comprises a main frame 12, said main frame consisting of a pair of elongated, generally U-shaped tubular side members 13, 13, each of the side members being braced at spaced locations therealong by short brace rods 14 rigidly connecting the arms of the U-shaped side members, said side members being in turn rigidly connected together in parallel relation by suitable cross members, such as bolts 16 extending through the intermediate portions of opposing cross bars 14, 14, and fastened thereto, as shown in Figure 4.

At their intermediate portions, the arms of the respective side members 12 are connected by plates 17 and extending through the intermediate portions of the plates 17 and rigidly secured thereto is a sleeve member 18. Rigidly secured to the opposite end portions of the sleeve member 18 are the parallel tubular arms 19, 19.

Figure 7:
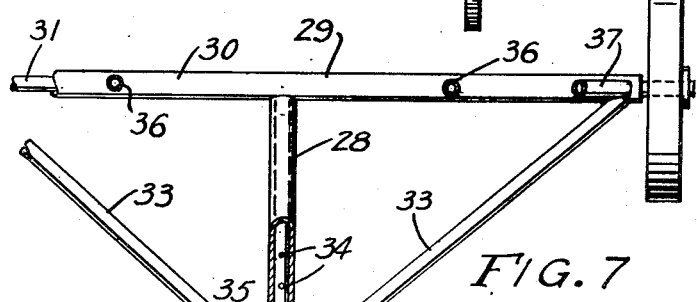
Figure 7 is a fragmentary enlarged horizontal cross sectional view taken on the line 7—7 of Figure 1.
Figure 8:
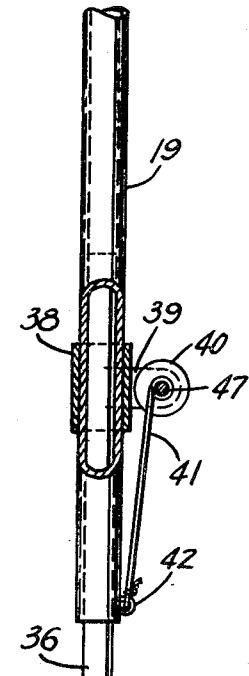
Figure 8 is an enlarged cross sectional detail view taken on the line 8—8 of Figure 1.

Rigidly connecting the lower portions of the side arms of the respective side members 13, 13 are cross bars 20, the opposing cross bars 20 being suitably interconnected to provide a rigid parallel connection of the lower portions of the side members 13, 13. Thus, the cross members 20 may be connected by a transverse shaft 21, as shown in Figure 7. Rotatably mounted on the shaft 21 is a sleeve member 22 forming a part of a tongue structure 23, said tongue structure including arms 24, 24 connected rigidly to the end portions of the sleeve member 22 and converging toward a hitch member 25 to which the arms are rigidly connected, as shown. Rigidly connected to the intermediate portion of the sleeve 22 is a shaft element 26 extending perpendicular to the sleeve 22 on the opposite side thereof with respect to the arms 24, the shaft member 26 being telescopically received in a longitudinal sleeve member 28 forming part of a wheeled subframe 29. The subframe 29 comprises a transverse sleeve 30, to the intermediate portion of which the longitudinal sleeve 28 is rigidly connected, the sleeve 30 receiving a transverse axle 31 on the ends of which are secured the respective supporting wheels 32, 32. Respective diagonal brace bars 33, 33 rigidly connect the opposite end portions of sleeve 30 to the forward end portion of the sleeve 28. The shaft element 26 is telescopically received in the sleeve 28, as above stated, and may be secured in an adjusted position therein by suitable fastening pins engaged through selected, longitudinally spaced apertures 34 in the shaft 26 and through diametrically opposite apertures 35 provided in the forward end portion of sleeve 28, the apertures 35 being registrable with a selected aperture 34.

A plurality of pins may be provided, in which case a plurality of apertures 35 will be provided in the sleeve 28, or alternatively, a single pair of opposing apertures may be provided in the sleeve 28, said opposing apertures being registrable with a selected aperture 34. Where a plurality of pairs of apertures 35 are provided in the sleeve 28, the apertures are spaced longitudinally by the same distance as the aperture 34 in the shaft 26, whereby the fastening pins may be engaged through the registering apertures.

Rigidly secured to the sleeve 30 and spaced equal distances on opposite sides of the sleeve 28 are the upstanding rod members 36, 36 whose upper portions are telescopically received in the respective depending tubular arms 19, 19. Rigidly secured to the opposite end portions of sleeve 30 are a pair of upwardly and inwardly inclined strut bars 37, 37 having secured to their top ends respective sleeve elements 38, 38 slidably receiving the respective tubular arms 19, 19. Each sleeve element 38 is provided with a pair of rearwardly extending parallel arms 39 between which is journaled a reel 40 on which is wound a cable 41. The lower end of the cable 41 is connected to an eye member 42 secured to the subjacent portion of the associated upstanding rod 36. The reels 40 are mounted on a common transverse shaft 47 provided with an operating handle 48 and with suitable conventional, manually releasable locking means, whereby the reels may be locked in desired positions of rotation, and whereby the cables 41 will support the arms 19 in desired adjusted positions with respect to the upstanding rods 36.

From the above description, it will be apparent that the main frame 12 may be supported in an upstanding position on the subframe 29 and at a desired angle of inclination with respect to the vertical.

Designated at 43 is a first sprocket shaft which is journaled between the lower portions of the side members 13, 13 of the main frame in any suitable manner, as by use of supporting plates 44 rigidly connected to the respective side members and providing bearing means for the shaft 43. Secured to one end of the shaft outwardly adjacent its supporting plate 44 is a large gear 45 which meshes with a small gear 46 journaled on the plate 44, as shown in Figure 2, the small gear 46 having connected thereto a shaft 47 adapted to be connected to the power takeoff shaft of a conventional farm tractor.

Figure 3:
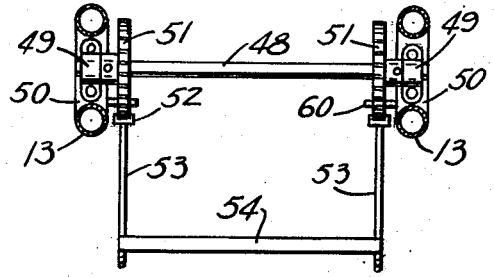
Figure 3 is an enlarged horizontal cross sectional view taken on the line 3—3 of Figure 1.
Figure 5:
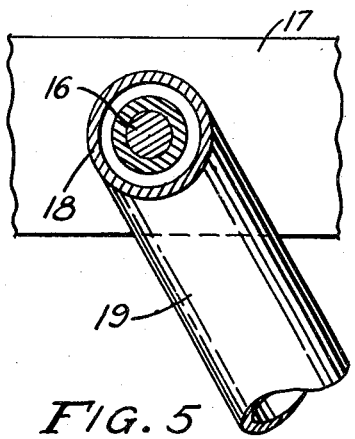
Figure 5 is an enlarged cross sectional detail view taken on the line 5—5 of Figure 4.

Journaled between the top end portions of the side members 13, 13 is a second sprocket shaft 48, said sprocket shaft being journaled in suitable bearings 49, 49 mounted on cross members 50, 50 connecting the side arms of the respective side members 13, as shown in Figure 3. Secured on the respective shafts 43 and 48 inwardly adjacent the side members 13, 13 are respective pairs of sprocket wheels on which are engaged respective endless sprocket chains 51, 51. Secured to the sprocket chains are respective pairs of brackets 52, 52 to which are pivoted respective bale-supporting arms 53, the pairs of arms 53 being connected by transverse bars 54, as shown in Figure 9, the arms 53 being provided with depending stop bars 55 connected to the forward portions of the arms 53 by struts 56, the stop bars 55 being engageable with the respective chains 51 to limit the rotation of the bale-supporting frames, thus defined to positions extending horizontally outwardly from the chains 51, although allowing the bale-supporting frames to rotate upwardly, as shown in dotted view in Figure 9.

Respective pairs of brackets 57, 57 are provided on the side arms of the respective side members 13, 13 above the sprocket shaft 43, said brackets 57 being employed to secure respective stationary bale-supporting arms 58, 58 in forwardly extending positions with respect to the side members 13, as shown in Figure 2.

As shown in Figure 2 two or more pairs of bracket members 57, 57 may be provided on the side members 13, said pairs of bracket members 57 being spaced vertically, whereby the arms 58 may be secured at any one of a plurality of desired elevations on the side members 13, 13.

In operation, a bale 59 is loaded onto the supporting arms 58, 58, the sprocket shaft 53 being driven by any suitable means, as by the power takeoff shaft of a conventional farm tractor. The bale engaging frames comprising the arms 53 move with the sprocket chains and engage the bale 59, lifting the bale to the top of the main frame 12, and depositing the bale at its intended point of delivery, the bale automatically being released from the elevator as its supporting frame passes over the top end of the main frame 12. Thus, the apparatus may be employed to deliver the bales to the top of a stack of bales, or to an elevated receiving location.

The forward arms of the side members 13, 13 may be provided with suitable guide means for the sprocket chains 51, for example, with inwardly projecting guide plates 60, 60 extending behind the forward runs of the sprocket chains, as shown in Figure 4, and supporting said forward runs. The bales 59 are supported in their upward movement by sliding engagement with the forward arms of the respective side members 13, 13, as is clearly apparent in Figure 2.

While a specific embodiment of an improved bale elevator has been disclosed in the foregoing description, it will be understood that various modifications within the spirit of the invention may occur to those skilled in the art. Therefore, it is intended that no limitations be placed on the invention except as defined by the scope of the appended claims.

What is claimed is:
1. In a bale elevator, a main frame, said main frame comprising a pair of elongated side members, and means connecting said side members in parallel relation, respective hollow struts pivoted to the intermediate portions of said side members, a wheeled supporting frame, upstanding arms on said supporting frame telescopically engaged in said struts, additional upstanding arms on said supporting frame slidably receiving said struts, means adjustably securing the lower ends of said struts to the upper ends of said additional upstanding arms, means connecting the lower end portion of said main frame to said supporting frame, a first horizontal sprocket shaft journaled in the lower portion of the main frame and extending transversely between said side members, a second horizontal sprocket shaft journaled in the top portion of said main frame and extending transversely between said side members, respective sprocket wheels on the shaft located inwardly adjacent said side members, respective endless sprocket chains on the sprockets wheels, respective bale-supporting frames pivoted to the sprocket chains, and means on the bale-supporting frames engageable with the chains to at times hold the bale-supporting frames in outwardly projecting positions.

2. In a bale elevator, a main frame, said main frame comprising a pair of elongated side members, and means connecting said side members in parallel relation, respective hollow struts pivoted to the intermediate portions of said side members, a wheeled supporting frame, parallel upstanding arms on said supporting frame telescopically engaged in said struts, upwardly and inwardly extending arms on the supporting frame slidably receiving the lower portions of said struts, means adjustably connecting the lower ends of said struts to the upper ends of said last-named arms, and means connecting the lower end portion of said main frame to said supporting frame, a first horizontal sprocket shaft journaled in the lower portion of the main frame and extending transversely between said side members, respective outwardly projecting parallel bale-supporting arms secured to the side members above the first sprocket shaft, a second horizontal sprocket shaft journaled in the top portion of said main frame and extending transversely between said side members, respective sprocket wheels on the shaft located inwardly adjacent said side members, respective endless sprocket chains on the sprocket wheels, respective bale-supporting frames pivoted to the sprocket chains, and means on the bale-supporting frames engageable with the chains to at times hold the bale-supporting frames in outwardly projecting positions.

References Cited in the file of this patent
UNITED STATES PATENTS

| | | |
|---|---|---|
| 897,462 | Hanak | Sept. 1, 1908 |
| 1,250,824 | Eshleman | Dec. 18, 1917 |
| 1,673,559 | Hanak | June 12, 1928 |
| 2,251,667 | Ehinger | Aug. 5, 1941 |

FOREIGN PATENTS

| | | |
|---|---|---|
| 727,834 | Great Britain | Apr. 6, 1955 |